Feb. 18, 1947.　　　R. H. MILLER　　　2,416,194
TRACTOR PLOW AND HITCH
Filed Nov. 22, 1943　　　2 Sheets-Sheet 1

Inventor:
Robert H. Miller,
By Paul O. Pippel
Attorney.

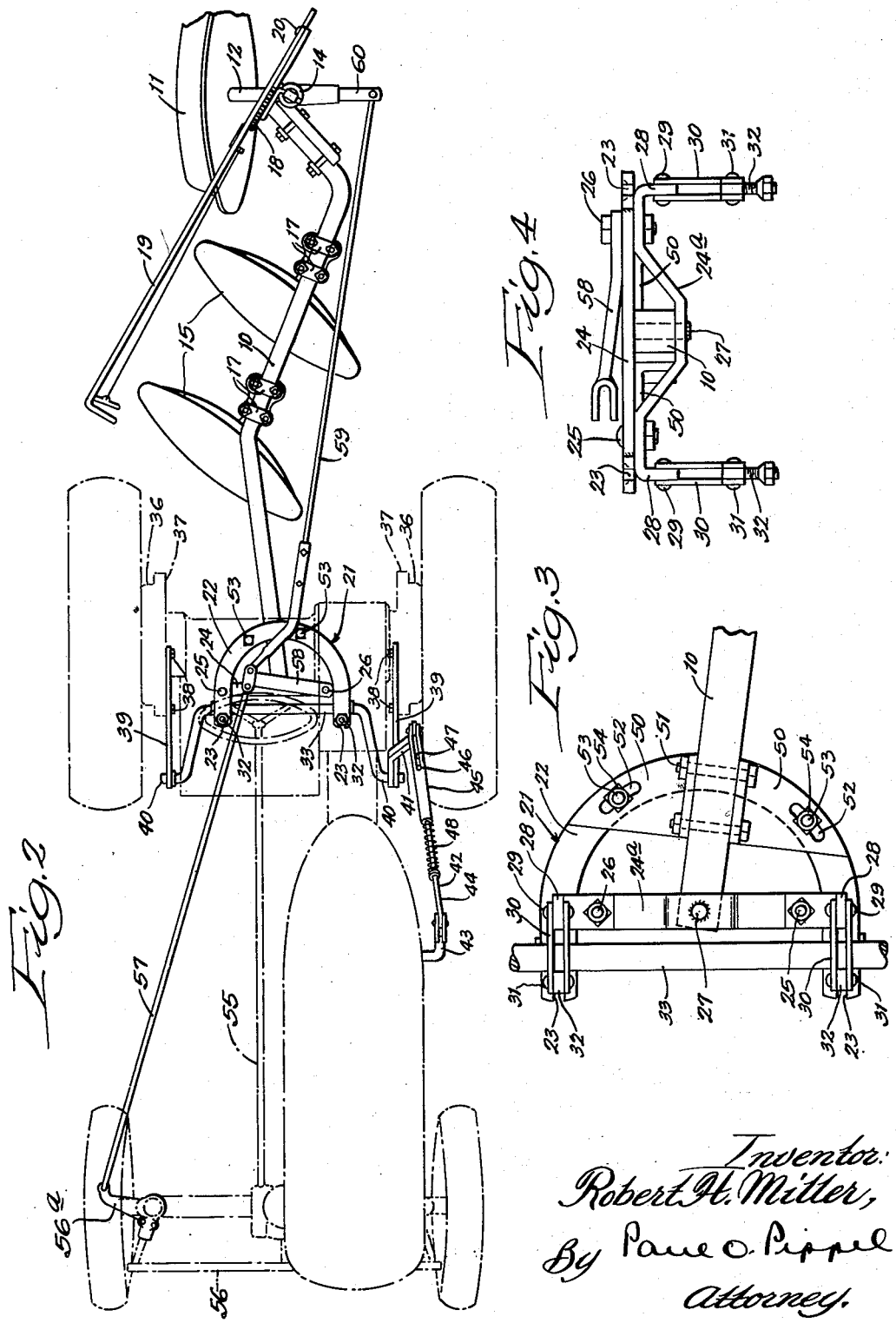

Patented Feb. 18, 1947

2,416,194

UNITED STATES PATENT OFFICE 2,416,194

TRACTOR PLOW AND HITCH

Robert H. Miller, Canton, Ill., assignor to International Harvester Company, a corporation of New Jersey Application November 22, 1943, Serial No. 511,273

3 Claims. (Cl. 97—98)

This invention relates to tractor-attached agricultural implements, and particularly to disk plows. More specifically the invention relates to a hitch mechanism for quickly attaching a disk plow to a tractor to be controlled therefrom.

Tractor-attached disk plows comprise generally a longitudinally extending frame member having a rear supporting wheel thereon which is guided from the tractor steering mechanism. This frame is laterally inclined with respect to the line of draft on a plow, and plow disks are mounted on the frame at longitudinally spaced points. One of the chief difficulties encountered in the development of this type of plow has been the provision of means for facilitating a rapid attachment of the plow to the tractor, while guarding against lateral tipping of the plow, and permitting lateral swinging movement thereof in response to turning of the tractor.

An object of the present invention is, therefore, the provision of a disk plow of improved construction for attachment to a tractor.

Another object is to provide means for the quick attachment of a disk plow to a tractor.

A further object is to provide novel means for stabilizing the plow to prevent lateral tipping while permitting lateral swinging movement thereof.

Still another object is to provide in a laterally swingable disk plow having a steerable rear wheel and a unitary hitch for attachment to a tractor, means for steering the rear wheel from the tractor steering mechanism and means on the hitch for stabilizing the steering means.

These and other objects will become clear from the following detailed description when read in conjunction with the accompanying drawings, wherein Figure 1 is a view in side elevation of the rear end of a tractor, having one wheel in a furrow and the other wheel removed, and illustrating the attachment thereto of a disk plow embodying the features of the present invention;

Figure 2 is a plan view on a smaller scale of the mechanism shown in Figure 1, and showing the entire tractor in phantom;

Figure 3 is a detail showing the hitch mechanism from below; and

Figure 4 is a front elevation of the hitch mechanism.

Figure 1:
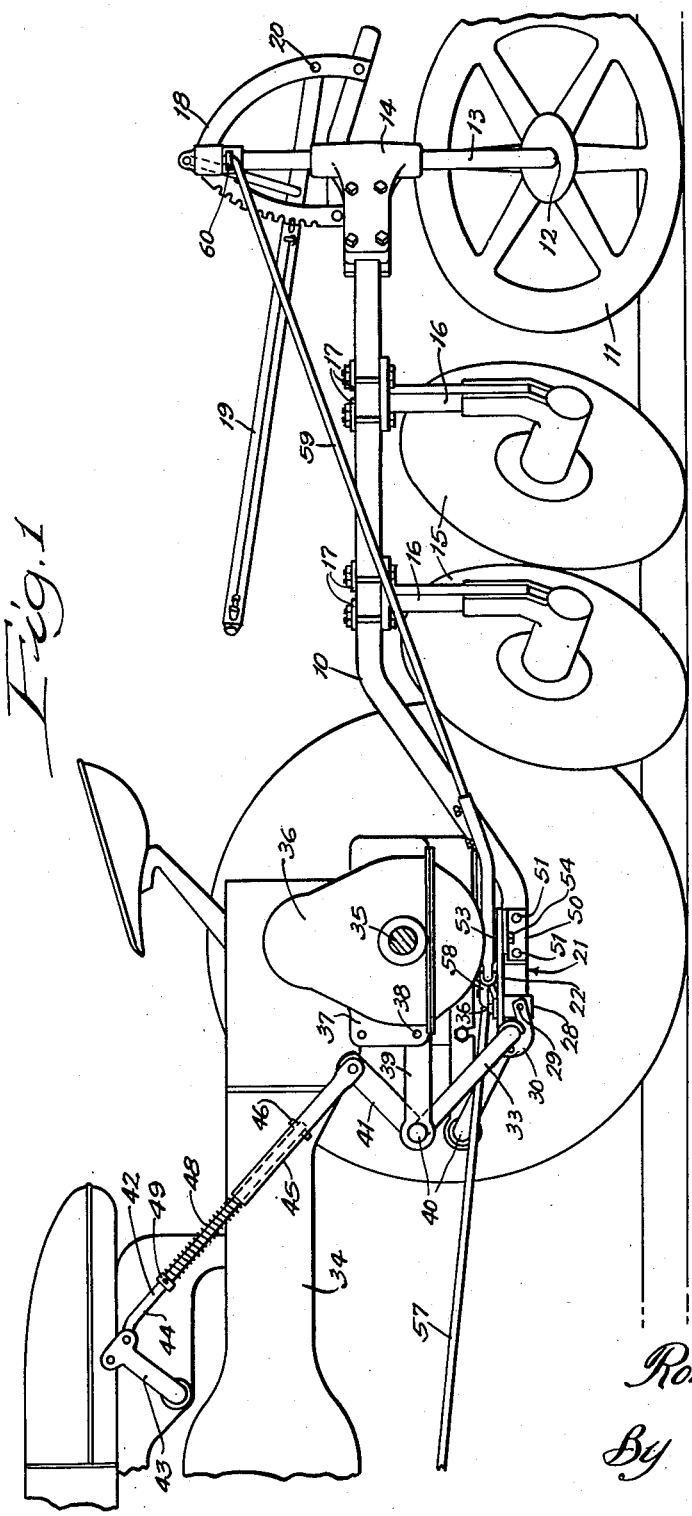

Referring to the drawings, it will be noted that the plow of the present invention embodies a generally longitudinally extending beam 10 and a rear furrow wheel 11. Furrow wheel 11 is journaled on an axle 12, having an upright portion 13, which is vertically slidable in the bearing portion of a bracket 14, affixed to the beam 10. The plow-supporting portion of the beam 10 is inclined to the line of draft upon the plow, and disks 15 are supported by standards 16 which are mounted upon the beam by clamps 17. Furrow wheel 11 is vertically adjusted to raise and lower the plow by a conventional adjusting mechanism comprising a quadrant 18 attached to bracket 14 and having a lever 19 pivoted thereon at 20.

The forward portion of beam 10 is provided with a hitch mechanism, generally indicated at 21, and comprising a segment 22, having slots 23 in the forwardly projecting arms thereof. The segment is braced by a cross-piece 24, weldingly secured to the inner wall of the segment, and having affixed thereto a U-shaped member 24a, secured to the cross-piece by bolts 25 and 26. The U-shaped portion 24a is sufficiently spaced from the cross-piece 24 to accommodate the forward end of beam 10, which is mounted for lateral pivotal movement upon a pin 27 fixed between the cross-piece 24 and the member 24a. The ends of member 24a are bent downwardly to form ears 28, each of which is apertured to receive a bolt 29 pivotally mounting a link 30. A pin 31, in the lower end of link 30, pivotally mounts a bolt 32, adapted to be received in the recess 23 in order to clamp the segment 22 to a draw-bar 33 mounted upon the tractor. The clamping elements just described thus constitute quick attachable means for readily connecting the plow to the tractor.

The tractor comprises generally a longitudinally extending body portion 34, a rear axle 35, and a depending axle housing 36 on opposite sides of the body portion and providing implement attaching portions 37. Attached to the portions 37 by bolts 38 are forwardly extending straps 39. These straps are apertured at their ends to receive for pivotal movement, outwardly bent legs 40 of the draw-bar 33. The transverse portion of draw-bar 33 extends downwardly so that, in the position shown in Figure 1, with one wheel in the furrow, the transverse portion is parallel to the ground.

Welded to the leg 40 on the left side of the tractor is an upwardly projecting arm 41, which is connected at its upper end by a rod 42 to a rock-arm 43, pivoted on the tractor for oscillatory movement. Arm 43 is operated from a source of power, not shown, to rock the draw-bar 33 and effect vertical adjustment of the hitch means 21 with respect to the tractor. Rod 42 comprises a shaft 44 connected to the arm 43, and a sleeve portion 45 connected to the arm 41. A pin 46 in the end of shaft 44 is slidably movable in a slot 47 in the sleeve portion 45, while a spring 48, surrounding the shaft 44, abuts the sleeve portion 45 and a collar 49, keyed to the shaft. Thus, vertical flexibility is imparted to the hitch member 21. For example, if the front end of the plow beam 10 should move upwardly, the draw-bar is rocked in a counterclockwise direction, as viewed in Figure 1, carrying with it arm 41, and urging sleeve member 45 against the action of the spring 48. Likewise the vertical position of the hitch may be adjusted by rocking the arm 43.

As stated before, the forward end of the beam 10 is pivoted upon the pin 27 for lateral swinging movement. This lateral swinging movement of the plow is necessary in order that the plow may properly follow the tractor when it is turned. However, in order to prevent the disks coming in contact with the rear wheels of the tractor, this lateral swinging movement is limited. For this purpose, opposite sides of the beam adjacent the forward end thereof are provided with angle plates 50, which are attached to the beam by bolts 51. These plates engage the under surface of the segment 22 and are provided with slots 52, curved to conform to the curvature of the segment 22. Bolts 53 in the segment pass through these slots and are held in place by nuts 54. However, nuts 54 are permitted to be sufficiently loose to allow lateral movement of the beam 10 within the limits provided by the slots 52.

It will now be noted that a novel hitch means has been provided for quickly attaching a disk plow to a tractor at laterally spaced points, by which the plow is stabilized or held against lateral tipping. The rear furrow wheel 11 is steered by the tractor steering mechanism, which includes a steering column 55 and a tie rod 56, by which the front wheels are steered in unison. This steering mechanism, through the intermediary of a pivot arm 56a, is disconnectably connected by a rod 57 to an arm 58 pivoted upon the bolt 26 for fore and aft swinging movement. Arm 58 is likewise connected by a rod 59 to a lug 60 affixed adjacent the upper end of the furrow wheel axle 13.

From the foregoing description, the operation of the plow of the present invention should be clear, and having described the invention, it should be understood that modifications may be made therein without departing from the spirit of the invention or the scope of the appended claims.

What is claimed is:

1. In combination with a tractor, a plow having a longitudinally extending tool-carrying beam laterally inclined with respect to the line of draft on the plow, stabilizing means unitary with the plow for preventing tilting thereof about a longitudinal axis comprising a segment mounted on the end of said plow beam and having forwardly extending laterally spaced arms, said plow beam and segment being substantially rigid against relative movement in a vertical plane, quick-attachable connections at the ends of said arms for attaching the plow to the tractor at laterally spaced points thereon, means for vertically moving the front end of said beam, and means pivoting said beam on said segment for lateral swinging movement.

2. In combination with a tractor, a plow having a longitudinally extending tool-carrying beam laterally inclined with respect to the line of draft on the plow, a draw-bar on the tractor, means for stabilizing the plow with respect to the tractor including a segment unitary with the plow, quick-attachable means at laterally spaced points on said segment for attaching the plow to said draw-bar, means for pivoting said beam on said segment for lateral swinging movement with respect thereto, and means for limiting lateral swinging movement of said beam including plates affixed to the side of said beam and slidably engaging said segment, bolts in said segment, and said plates having slots arranged to receive said bolts.

3. The combination with a tractor having a steering mechanism and dirigible front wheels, of a disk plow having a longitudinally extending laterally inclined tool-carrying beam and a steerable rear wheel, hitch means on the plow including a segment, means for pivoting said beam on said segment centrally thereof for free lateral swinging movement, means for limiting the lateral movement of said beam, and means for steering said rear wheel from said tractor steering mechanism in any position of said plow including an arm pivoted on said segment, means steerably connecting said arm and said rear wheel, means detachably connecting said hitch means to said tractor, and means detachably connecting said arm to said steering mechanism.

ROBERT H. MILLER.

REFERENCES CITED

The following references are of record in the file of this patent:

UNITED STATES PATENTS

| Number | Name | Date |
| --- | --- | --- |
| 1,952,486 | Beall | Mar. 27, 1934 |
| 2,077,942 | Lindgren | Apr. 20, 1937 |
| 1,226,793 | Morgan | May 22, 1917 |